US010620027B2

(12) United States Patent
Schollenberger et al.

(10) Patent No.: US 10,620,027 B2
(45) Date of Patent: Apr. 14, 2020

(54) CORIOLIS THRESHOLD DETERMINATION DEVICES AND METHODS

(71) Applicant: MICRO MOTION, INC, Boulder, CO (US)

(72) Inventors: Frederick Scott Schollenberger, Boulder, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 315 days.

(21) Appl. No.: 15/549,037

(22) PCT Filed: Jan. 6, 2016

(86) PCT No.: PCT/US2016/012340
§ 371 (c)(1),
(2) Date: Aug. 4, 2017

(87) PCT Pub. No.: WO2016/140734
PCT Pub. Date: Sep. 9, 2016

(65) Prior Publication Data
US 2018/0038724 A1 Feb. 8, 2018

Related U.S. Application Data

(60) Provisional application No. 62/128,255, filed on Mar. 4, 2015.

(51) Int. Cl.
*G01F 1/84* (2006.01)
*G01F 1/74* (2006.01)

(52) U.S. Cl.
CPC ............ *G01F 1/8431* (2013.01); *G01F 1/74* (2013.01); *G01F 1/8468* (2013.01)

(58) Field of Classification Search
CPC ........ G01F 1/74; G01F 1/8431; G01F 1/8436; G01F 1/8472; G01F 15/024
See application file for complete search history.

(56) References Cited

U.S. PATENT DOCUMENTS

2008/0011101 A1   1/2008   Storm

FOREIGN PATENT DOCUMENTS

| EP | 1845346 A2 | 10/2007 |
| EP | 2275787 A2 | 1/2011 |
| WO | 0019175 A1 | 4/2000 |
| WO | 2011008307 A1 | 1/2011 |

*Primary Examiner* — David M. Gray
*Assistant Examiner* — Andrew V Do
(74) *Attorney, Agent, or Firm* — The Ollila Law Group LLC

(57) ABSTRACT

A meter electronics (20) for a flowmeter (5) configured to receive a process fluid is provided. The meter electronics (20) includes an interface (201) configured to communicate with a flowmeter assembly of the flowmeter (5) and to receive a vibrational response. The meter electronics (20) comprises a drive gain threshold determination routine (215) configured to determine a first predetermined drive gain threshold (302), monitor a drive gain signal over a predetermined time period, and determine lowest points in the drive gain signal over the predetermined time period. A second drive gain threshold is determined based upon reaching a predetermined number of instances of low points of the drive gain signal.

22 Claims, 6 Drawing Sheets

| Time Period | Standard Drive Gain Threshold Without Damping | Number of Hold Values Created Based on Standard Threshold | Damped Drive Gain Threshold Using Minimum Method | Number of Hold Values Created Using Damped Threshold |
|---|---|---|---|---|
| 1 | 30 | | 30 | |
| 2 | 30 | 5 | 30 | 5 |
| 3 | 30 | 5 | 30 | 5 |
| 4 | 15 | 20 | 15 | 20 |
| 5 | 10 | 8 | 10 | 8 |
| 6 | 25 | 3 | 10 | 3 |
| 7 | 60 | 1 | 10 | 0 |
| 8 | 60 | 5 | 10 | 0 |
| 9 | 30 | 15 | 25 | 3 |
| 10 | 15 | 10 | 15 | 3 |

FIG. 6

CORIOLIS THRESHOLD DETERMINATION DEVICES AND METHODS

FIELD OF THE INVENTION

The present invention relates to Coriolis flowmeter devices and methods, and more particularly, to Coriolis flowmeter devices and methods for determining operating thresholds for multi-phase fluid flow.

BACKGROUND

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits (also called flow tubes) that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by a driver, e.g., an electromechanical device, such as a voice coil-type actuator, that perturbs the conduit in a periodic fashion. Mass flow rate may be determined by measuring time delay or phase differences between motions at the transducer locations. Two or more such transducers (or pickoff sensors) are typically employed in order to measure a vibrational response of the flow conduits, and are typically located at positions upstream and downstream of the driver. Instrumentation receives signals from the pickoff sensors and processes the signals in order to derive a mass flow rate measurement.

Flowmeters may be used to perform mass flow rate measurements for a wide variety of fluid flows. One area in which Coriolis flowmeters can potentially be used is in the metering of oil and gas wells. The product of such wells can comprise a multiphase flow, including the oil or gas, but also including other components, including water and air, for example, and/or solids. It is, of course, highly desirable that the resulting metering be as accurate as possible, even for such multiphase flows.

Coriolis meters offer high accuracy for single phase flows. However, when a Coriolis flowmeter is used to measure multiphase fluids such as fluids including entrained gas, the accuracy of the meter can be significantly degraded. This is similarly true for flows having entrained solids and for mixed-phase fluid flows, such as when hydrocarbon fluids contain water.

Entrained gas is commonly present as bubbles in the flow material. The size of the bubbles can vary, depending on the amount of air present, the pressure of the flow material, and the temperature. A related and significant source of error arises from fluid decoupling. Fluid decoupling results from the motion of the gas bubbles with respect to the liquid as a result of the vibration of the tube. The relative motion of the gas bubbles with respect to the liquid is driven by a buoyant force that is similar to the force that causes bubbles to rise to the surface under the influence of gravity. However, in a vibrating tube, it is the acceleration of the vibrating tube that causes the bubbles to move more than the acceleration of gravity. Because the dense fluid has more mass than the light bubbles, the bubbles have greater acceleration than the fluid in the direction of the tube acceleration. Due to the greater acceleration of the bubbles, on each oscillation of the flow conduit, the bubbles move further than the flow conduit. Additionally, the bubble motion causes some of the fluid to move less than the flow conduit. This is the basis of the decoupling problem. As a result, the fluid that has the lower vibrational amplitude undergoes less Coriolis acceleration and imparts less Coriolis force on the flow conduit than it would in the absence of bubbles. This results in the flow rate and density characteristics being under-reported (negative flow and density errors) when entrained gas is present. Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. Another influence on bubble mobility is the bubble size. The drag on a bubble is proportional to the surface area, whereas the buoyant force is proportional to the volume. Therefore, very small bubbles have a high drag to buoyancy ratio and tend to move with the surrounding fluid. Small bubbles subsequently cause small errors. Conversely, large bubbles tend not to move with the surrounding fluid and result in large errors. The same holds true for particles. Small particles tend to move with the fluid and cause small errors.

The density difference between the fluid and the gas is another factor that may contribute to flowmeter inaccuracy. The buoyant force is proportional to the difference in density between the fluid and the gas. A high pressure gas can have a high enough density to affect the buoyant force and reduce the decoupling effect.

In addition to measurement errors, the effect of multi-phase flow on Coriolis meters is increased by damping on the flow conduit, resulting in the diminishment of flow conduit vibratory amplitude. Typically, meter electronics compensate for this diminished amplitude by increasing the drive energy, or drive gain, in order to restore the amplitude. Even very small amounts of gas can cause a large increase in drive gain.

To correct for errors due to multi-phase flow, measured variables including density, mass flow, and volume flow are used from a period of single phase flow (liquid only)—these values are referred to as hold values. Hold values are used during multi-phase flow to replace or improve the accuracy of measured variables. Currently, hold values are determined at a user specified point in time before multiphase conditions exist.

Previously, drive gain has been used to determine whether or not there is multi-phase flow in the meter. If a meter's drive gain goes above a certain threshold, then the fluid in the meter is considered to be multi-phase flow and corrective action can be taken to improve the accuracy of the measured values. In prior art meters, a default value for drive gain threshold is used. In practice, the default value must be set conservatively high so that it will work for most applications. This must be done for three reasons: (1) Every Coriolis meter has a different base drive gain. This is the drive gain required to drive the flow conduit under purely single phase flows. Because of this, the drive gain must be high enough to work for every meter. For example, a typical nominal drive gain for one meter family might be 2%, whereas the nominal value for another meter family might be 20%. This nominal value depends on many things, including magnet strength and design, coil design, and meter size/stiffness; (2) Purely liquid multi-component mixtures composed of one or more different density liquids will have the same decoupling effect as gas and liquid fluids, although much smaller. Errors are mostly negligible in purely liquid multi-component flow, but there can still be small increases in drive gain that should not be treated as gas. Again, the threshold must be high enough to not mistake purely liquid flow as gas and liquid flows; and (3) For some applications, there may never be periods of pure liquid from which to base hold values. However, often times there are periods of mostly liquid where only small traces of gas may exist. The drive gain threshold is set high enough so that these periods are treated as pure liquid so that hold values may be created, and the periods of very high gas may still be corrected. The default value works for some applications. However, for applications where there may be only small amounts of gas entering the meter, the default threshold may be too high. Due to drive gain's sporadic nature, and the potential that drive gain threshold is set too high, this method does not always produce hold values from periods of minimal or no gas. For applications where there is always enough gas such that the drive gain never drops below the threshold, the default threshold is too low.

In cases where the default threshold isn't suitable, an operator must manually configure the flowmeter to use a more accurate value. This process requires the operator to collect and monitor data from the meter and manually set a new threshold value. Should process conditions change over time, this threshold may need to be readjusted. This is a timely and expensive process. Aside from the time wasted, there are also safety regulations which sometimes prevent the convenient use of a laptop to connect to meters in the field.

There remains a need in the art for a vibratory flowmeter that mitigates problems associated with setting an appropriate drive gain threshold for dealing with multi-phase flow. Embodiments herein provide methods used to determine an ideal threshold. Further, these embodiments disclose how often to output data, and how frequently to try to find related data values, such as hold values, for example.

SUMMARY OF THE INVENTION

A method for determining a drive gain threshold for a vibratory flowmeter is provided according to an embodiment. The method comprises placing a process fluid in the vibratory flowmeter and determining a first predetermined drive gain threshold. A drive gain signal is monitored over a predetermined time period, and the lowest points in the drive gain signal over this predetermined time period are determined. A second drive gain threshold is determined based upon reaching a predetermined number of instances of low points of the drive gain signal.

Meter electronics for a flowmeter configured to receive a process fluid are provided according to an embodiment. The meter electronics comprise an interface configured to communicate with a sensor assembly of the flowmeter and receive a vibrational response, and a processing system coupled to the interface. The processing system comprises a drive gain threshold determination routine configured to determine a first predetermined drive gain threshold and monitor a drive gain signal over a predetermined time period. The lowest points in the drive gain signal are determined over the predetermined time period. A second drive gain threshold is determined based upon reaching a predetermined number of instances of low points of the drive gain signal.

ASPECTS OF THE INVENTION

According to an aspect, a method for determining a drive gain threshold for a vibratory flowmeter is provided. The method comprises: placing a process fluid in the vibratory flowmeter; determining a first predetermined drive gain threshold; monitoring a drive gain signal over a predetermined time period; determining lowest points in the drive gain signal over the predetermined time period; and determining a second drive gain threshold based upon reaching a predetermined number of instances of low points of the drive gain signal.

Preferably, the method comprises the step of replacing the first predetermined drive gain threshold with the second predetermined drive gain threshold.

Preferably, the method comprises the step of recording at least one hold value during periods where the drive gain signal drops below the first predetermined drive gain threshold.

Preferably, the method comprises the step of averaging values of the drive gain signals recorded during each instance where the drive gain signal drops below the first predetermined drive gain threshold.

Preferably, the method comprises the step of recording each instance where the drive gain signal drops below the first predetermined drive gain threshold, only if the drive gain signal drops below the first predetermined drive gain threshold for a predetermined period of time.

Preferably, the at least one hold value comprises at least one of a flow rate and a density of the process fluid.

Preferably, the predetermined time period for monitoring a drive gain signal comprises a rolling window.

Preferably, the method comprises the step of adding a constant value to at least one of the first predetermined drive gain threshold and the second predetermined drive gain threshold.

Preferably, the method comprises the step of: calculating the drive gain signal wherein $$\text{drive gain} = \frac{\text{Drive Target}}{\left(\frac{\text{Max}(LPO, RPO)}{\lambda}\right)},$$

where: Drive Target is a conduit amplitude set point; Max (LPO, RPO) is a maximum pickoff voltage between a left and right pickoff sensors; and $\lambda$ is a frequency of the flow conduits.

Preferably, the step of replacing the first predetermined drive gain threshold with the second predetermined drive gain threshold comprises a damping such that the first predetermined drive gain threshold is replaced with an average of the second predetermined drive gain threshold and a predetermined number of previously recorded drive gain thresholds.

Preferably, the step of replacing the first predetermined drive gain threshold with the second predetermined drive gain threshold comprises a damping such that the first predetermined drive gain threshold is replaced with a minimum of the second predetermined drive gain threshold and a predetermined number of previously recorded drive gain thresholds.

According to an aspect, meter electronics for a flowmeter are provided. The flowmeter is configured to receive a process fluid, and the meter electronics comprise an interface configured to communicate with a sensor assembly of the flowmeter and receive a vibrational response. A processing system coupled to the interface comprises a drive gain threshold determination routine configured to: determine a first predetermined drive gain threshold; monitor a drive gain signal over a predetermined time period; determine the lowest points in the drive gain signal over the predetermined time period; and determine a second drive gain threshold based upon reaching a predetermined number of instances of low points of the drive gain signal.

Preferably, the drive gain threshold determination routine is configured to replace the first predetermined drive gain threshold with the second predetermined drive gain threshold.

Preferably, the drive gain threshold determination routine is configured to record at least one hold value during periods where the drive gain signal drops below the first predetermined drive gain threshold.

Preferably, the drive gain threshold determination routine is configured to average values of the drive gain signals recorded during each instance where the drive gain signal drops below the first predetermined drive gain threshold.

Preferably, the drive gain threshold determination routine is configured to determine the lowest points in the drive gain signal over the predetermined time, only if the drive gain signal drops below the first predetermined drive gain threshold for a predetermined period of time.

Preferably, the at least one hold value comprises at least one of a flow rate and a density of the process fluid.

Preferably, the predetermined time period for monitoring a drive gain signal comprises a rolling window.

Preferably, the drive gain threshold determination routine is configured to add a constant value to at least one of the first predetermined drive gain threshold and the second predetermined drive gain threshold.

Preferably, the drive gain threshold determination routine is configured to calculate the drive gain signal, wherein $$\text{drive gain} = \frac{\text{Drive Target}}{\left(\frac{\text{Max}(LPO, RPO)}{\lambda}\right)},$$

where: Drive Target is a conduit amplitude set point; Max (LPO, RPO) is a maximum pickoff voltage between a left and right pickoff sensors; and $\lambda$ is a frequency of the flow conduits.

Preferably, replacing the first predetermined drive gain threshold with the second predetermined drive gain threshold comprises a damping such that the first predetermined drive gain threshold is replaced with an average of the second predetermined drive gain threshold and a predetermined number of previously recorded drive gain thresholds.

Preferably, replacing the first predetermined drive gain threshold with the second predetermined drive gain threshold comprises a damping such that the first predetermined drive gain threshold is replaced with the minimum of the second predetermined drive gain threshold and a predetermined number of previously recorded drive gain thresholds.

BRIEF DESCRIPTION OF THE DRAWINGS

FIG. 6 illustrates a table of an embodiment exhibiting drive gain damping.

DETAILED DESCRIPTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
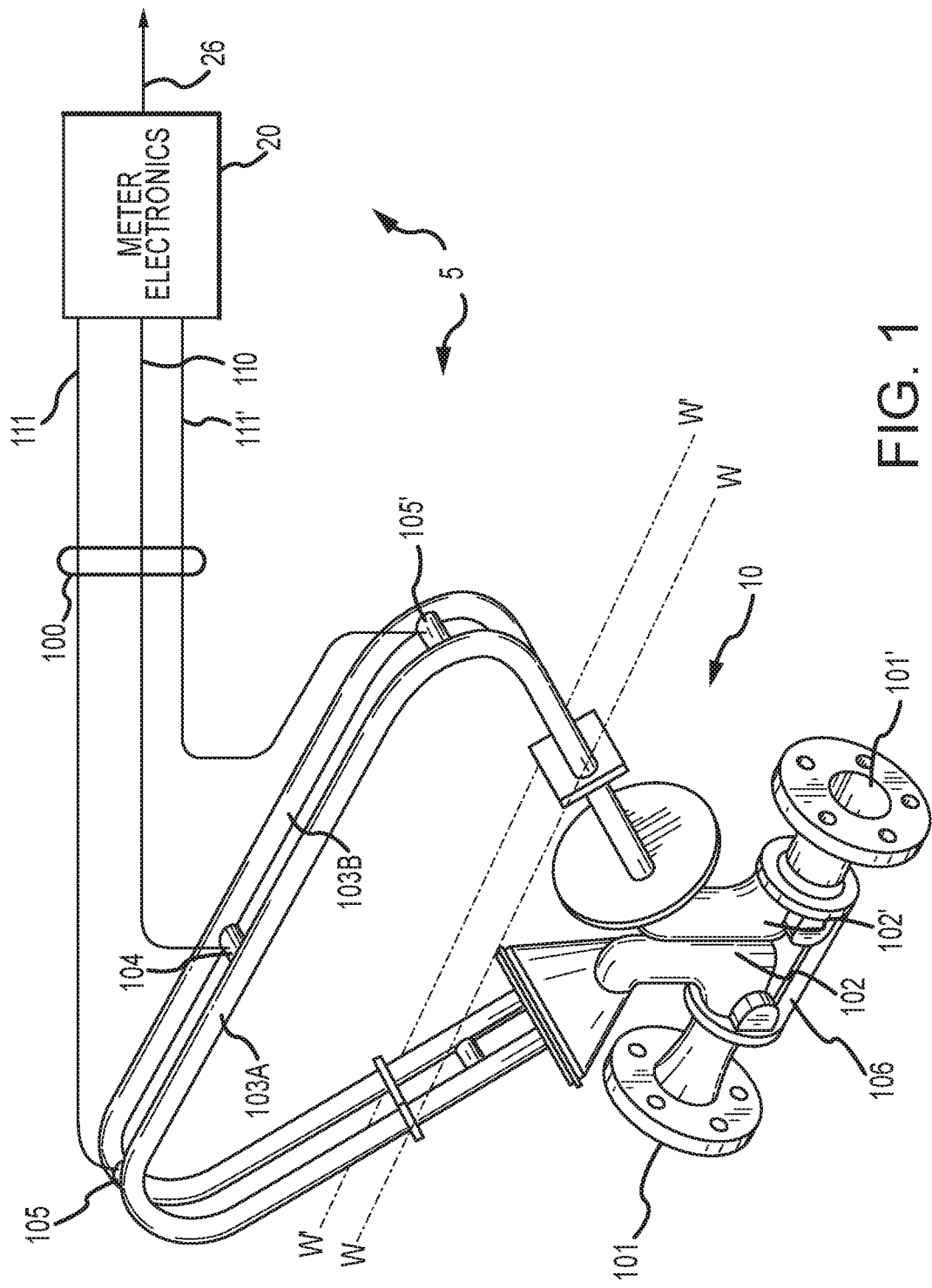
FIG. 1 shows a flowmeter comprising a meter assembly and meter electronics.

FIG. 1 shows a flowmeter 5 according to the invention. The flowmeter 5 comprises a sensor assembly 10 and meter electronics 20. The meter electronics 20 is connected to the sensor assembly 10 via leads 100 and is configured to provide measurements of one or more of a density, mass flow rate, volume flow rate, totalized mass flow, temperature, or other measurements or information over a communication path 26. The flowmeter 5 can comprise a Coriolis mass flowmeter. It should be apparent to those skilled in the art that the flowmeter 5 can comprise any manner of flowmeter 5, regardless of the number of drivers, pick-off sensors, flow conduits, or the operating mode of vibration.

The sensor assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106 in some embodiments. The spacer 106 maintains the spacing between the manifolds 102 and 102'. When the sensor assembly 10 is inserted into a pipeline (not shown) which carries the process fluid being measured, the process fluid enters the sensor assembly 10 through the flange 101, passes through the inlet manifold 102 where the total amount of process fluid is directed to enter the flow conduits 103A and 103B, flows through the flow conduits 103A and 103B and back into the outlet manifold 102', where it exits the meter assembly 10 through the flange 101'.

The process fluid can comprise a liquid. The process fluid can comprise a gas. The process fluid can comprise a multi-phase fluid, such as a liquid including entrained gases and/or entrained solids. The flow conduits 103A and 103B are selected and appropriately mounted to the inlet manifold 102 and to the outlet manifold 102' so as to have substantially the same mass distribution, moments of inertia, and elastic moduli about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the vibratory flowmeter 5. The driver 104 may comprise one of many well-known arrangements, such as a magnet mounted to the flow conduit 103A and an opposing coil mounted to the flow conduit 103B. An alternating current is passed through the opposing coil to cause both conduits to oscillate. A suitable drive signal is applied by the meter electronics 20 to the driver 104 via lead 110. Other driver devices are contemplated and are within the scope of the description and claims.

The meter electronics 20 receives sensor signals on the leads 111 and 111', respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 1 is provided merely as an example of the operation of a flowmeter and is not intended to limit the teaching of the present invention.

The meter electronics 20 in one embodiment is configured to vibrate the flow conduits 103A and 103B. The vibration is performed by the driver 104. The meter electronics 20 further receives resulting vibrational signals from the pickoff sensors 105 and 105'. The vibrational signals comprise a vibrational response of the flow conduits 103A and 103B. The meter electronics 20 processes the vibrational response and determines a response frequency and/or phase difference. The meter electronics 20 processes the vibrational response and determines one or more flow measurements, including a mass flow rate and/or density of the process fluid. Other vibrational response characteristics and/or flow measurements are contemplated and are within the scope of the description and claims.

In one embodiment, the flow conduits 103A and 103B comprise substantially U-shaped flow conduits, as shown. Alternatively, in other embodiments, the wellhead measurement device can comprise substantially straight flow conduits. Additional flowmeter shapes and/or configurations can be used and are within the scope of the description and claims.

Figure 2:
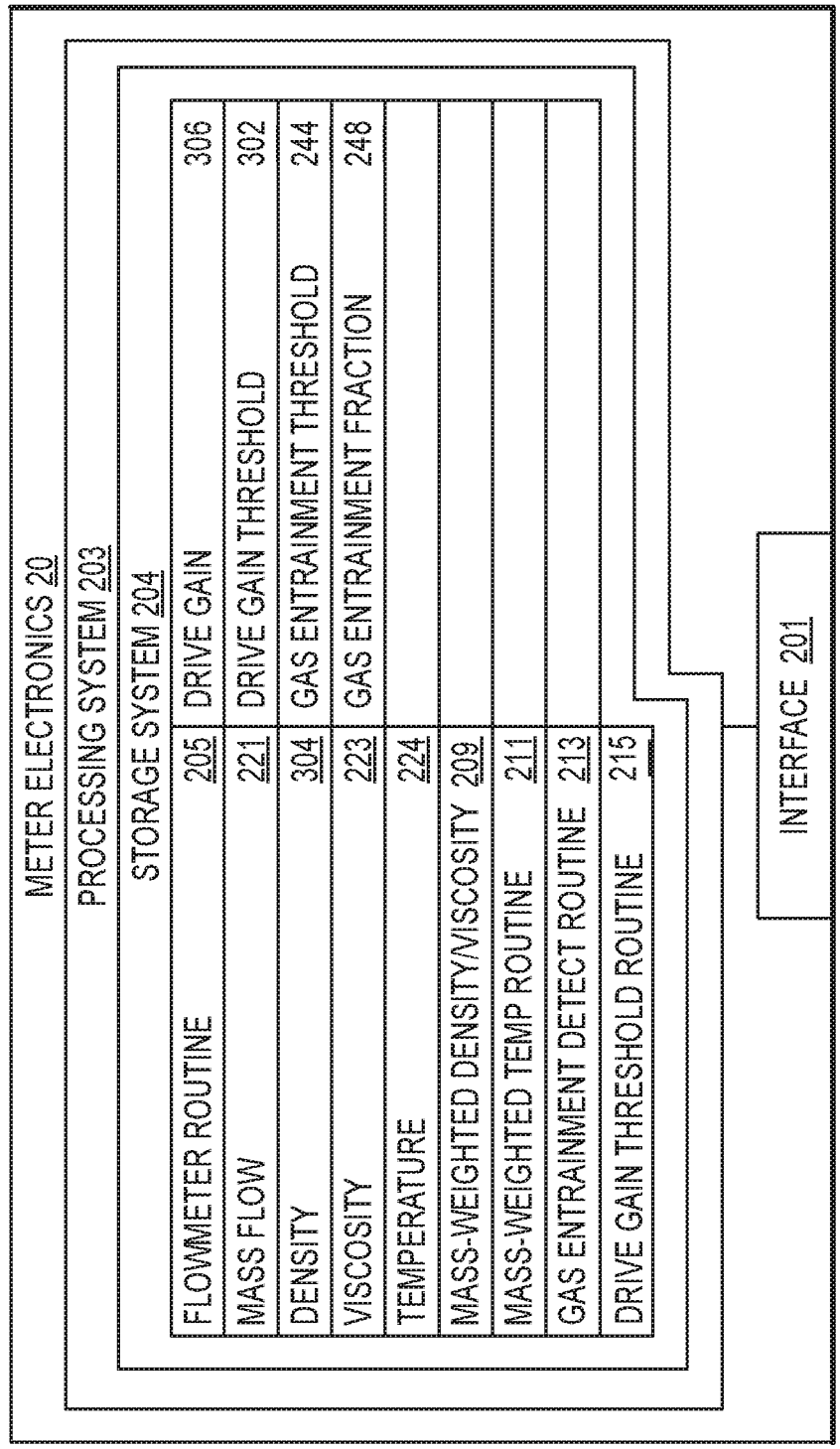
FIG. 2 shows a block diagram of the meter electronics according to an embodiment of the invention.

FIG. 2 is a block diagram of the meter electronics 20 of the flowmeter 5 according to an embodiment. In operation, the flowmeter 5 provides various measurement values that may be outputted including one or more of a measured or averaged value of water cut, mass flow rate, volume flow rate, individual flow component mass and volume flow rates, and total flow rate, including, for example, both volume and mass flow.

The flowmeter 5 generates a vibrational response. The vibrational response is received and processed by the meter electronics 20 to generate one or more fluid measurement values. The values can be monitored, recorded, totaled, and output.

The meter electronics 20 includes an interface 201, a processing system 203 in communication with the interface 201, and a storage system 204 in communication with the processing system 203. Although these components are shown as distinct blocks, it should be understood that the meter electronics 20 can be comprised of various combinations of integrated and/or discrete components.

The interface 201 is configured to communicate with the sensor assembly 10 of the measurement device 5. The interface 201 may be configured to couple to the leads 100 (see FIG. 1) and exchange signals with the driver 104 and the pickoff sensors 105 and 105'. The interface 201 may be further configured to communicate over the communication path 26, such as to external devices.

The processing system 203 can comprise any manner of processing system. The processing system 203 is configured to retrieve and execute stored routines in order to operate the flowmeter 5. The storage system 204 can store routines including a flowmeter routine 205, a mass-weighted density/viscosity routine 209, a mass-weighted temperature routine 211, a gas entrainment detect routine 213, and a drive gain threshold determination routine 215. Other measurement/processing routines are contemplated and are within the scope of the description and claims. The storage system 204 can store measurements, received values, working values, and other information. In some embodiments, the storage system stores at least one of a mass flow ($\dot{m}$) 221, a density ($\rho$) 304, a viscosity ($\mu$) 223, a temperature (T) 224, a drive gain 306, a drive gain threshold 302, a gas entrainment threshold 244, and a gas entrainment fraction 248.

The flowmeter routine 205 can produce and store fluid quantifications and flow measurements. These values can comprise substantially instantaneous measurement values or can comprise totaled or accumulated values. For example, the flowmeter routine 205 can generate mass flow measurements and store them in the mass flow storage 221 of the system storage 204, for example. The flowmeter routine 205 can generate density measurements and store them in the density storage 304, for example. The mass flow and density values are determined from the vibrational response, as previously discussed and as known in the art. The mass flow and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example, a liquid-only fluid state, or alternatively, a fluid state including liquids and entrained gas. In addition, other mass flow and related quantifications are contemplated and are within the scope of the description and claims.

The method for determining a drive gain threshold 302 varies depending on the application. In an embodiment, fluid properties and rates are assumed to remain relatively constant over time ("steady applications"), and it is assumed that there will be no sudden fluctuations. It should be noted that, for purposes of the embodiments provided herein, that the term drive gain may, in some embodiments, refer to drive current, pickoff voltage, or any signal measured or derived that indicates the amount of power needed to drive the flow conduits 103A, 103B at a particular amplitude. In related embodiments, the term drive gain may be expanded to encompass any metric utilized to detect multi-phase flow, such as noise levels, standard deviation of signals, damping-related measurements, and any other means known in the art to detect multi-phase flow. A working example of this, without limitation, is a naturally producing oil well in which the flow rate is driven by the well pressure underground. The pressure is assumed to remain fairly constant over short time periods (<1 day, for example). Artificial lift wells such as those driven by an electrical submersible pump would also fall into this application as the flow rates are kept fairly constant. As a result of fairly constant conditions, it is appropriate to be sensitive to small increases in drive gain and to remain in a corrective state the majority of the time. That is, for applications that are known to have constant flow rates and densities, it is often desirable to interpolate for lengthy periods of time in search of accurate measurements taken at periods of low-gas-content, thus ignoring much of the erroneous measurements taken at higher-gas-content periods in between.

In this embodiment, it is assumed that the mixture volume flow rate (gas and liquid) is constant while gas is present. Therefore, liquid flow rate may be calculated based on the following equation, for example without limitation:

$$\dot{V}_{liquid\ 2} = \dot{V}_{mixture} * (1-GVF) \tag{1}$$

Where:
GVF is the gas volume fraction.

In flow conditions where no gas is present, the mixture volume flow rate is equal to the liquid volume flow rate. However, in one embodiment, the assumption is made that mixture volume flow rate doesn't change when gas is present.

At times when a drive gain is low and stable, gas is not present in the pipeline and all measurements may be assumed to be accurate within normal flowmeter specifications. Many fluid sources involve only intermittent entrained gas, and over the course of an hour, or day, or other predetermined period of time, it is likely a time interval exists where little or no gas is present. During this time, the drive gain is low and stable, and flow rate, density, and any other measurement made by the meter may be trusted and output to the user or recorded for statistical analysis. This would allow an accurate determination of component flow rates at that period of low drive gain, for example without limitation.

As noted above, when a flowmeter's 5 drive gain rises above a certain threshold, then the fluid in the meter is considered to be multi-phase flow, and corrective action is taken to improve the accuracy of the measured values. Thus, when drive gain is above the threshold, the meter operates in a corrective state. Hold values (measured variables utilized from a period of single phase flow) for density, volume flow rate, and mass flow rate from periods of low drive gain 306 (drive gain 306 is below the drive gain threshold 302) are therefore utilized during the corrective state so as to replace or improve the accuracy of measured variables. Because flow rates and density can change over time, hold values must be periodically updated; however for the majority of the time, the drive gain threshold determination routine 215 may remain in a corrective state and interpolate through even small amounts of entrained gas. It is acceptable to remain in this corrective state for relatively long periods of time, as the alternative is to accept large errors associated with entrained gas in a flowmeter 5. Thus, it is more beneficial to measure accurate values only occasionally than to frequently take measurements that exhibit large errors. If the threshold is set too high, then the measured values and hold values may be based on multi-phase measurements and the corrected liquid values will be in error.

If the drive gain threshold is set too low, then hold values may never be determined during a given time period. For example, in applications where there is gas present at all/most times, such that the drive gain never drops below the threshold, the default threshold is clearly set too low. In an embodiment, the drive gain threshold 302 is thus set such that hold values are periodically determined from periods of minimum drive gain. Should the minimum drive gains increase or decrease over time, then the drive gain threshold 302 is adjusted automatically. In an embodiment, the drive gain threshold 302 value is determined not based on a desire to identify periods of time with and without gas, like in the prior art, but rather the drive gain threshold 302 is chosen specifically to determine the number of hold values it will create over a given period. This number of hold values and the time period can be specified by the user in an embodiment, however, this may also be determined at the time of flowmeter 5 construction/testing. For example, for a given application, it might make sense to automatically determine a drive gain threshold 302 that will allow for five updates to the hold values during a given time period. Five updates is merely an example, and more or less updates over a predetermined time frame is contemplated.

This concept represents a departure from the historical idea of choosing a drive gain threshold 302 as the value above which the drive gain threshold determination routine 215 assumes gas has been detected. Flowmeters 5 have the ability to detect even small amounts of entrained gas in a liquid stream via a measurement of tube drive power, known as the diagnostic drive gain 306. Drive gain 306 is a measure of the amount of drive power required to keep the flow conduits of a Coriolis meter vibrating at constant amplitude. For single phase measurement of gas or liquid, the drive gain 306 is low and steady, as relatively little power is required to vibrate a structure at its natural frequency. However, when even small amounts of gas is present in a liquid, or small amounts of liquid are present in a gas, the drive power required for vibration increases dramatically. This makes drive gain 306 a very reliable detection diagnostic for entrained gas. Historically, the drive gain threshold 302 was simply used as a way to identify portions of time where gas is present. This was basically employed as a binary indication of the presence/absence of gas. In the embodiments presented however, gas may be present often or always, so taking the best measurements possible—those with the least gas and lowest drive gain—is practiced. Thus, the drive gain threshold 302 is automatically determined based not simply on detection of gas, but rather on finding the periods of minimum gas in order to find the best hold values available for a given period of time. This balances the need for accuracy with the need for occasionally updating values to detect changes in process flow rate and fluid composition.

Steady Applications

Figure 3:
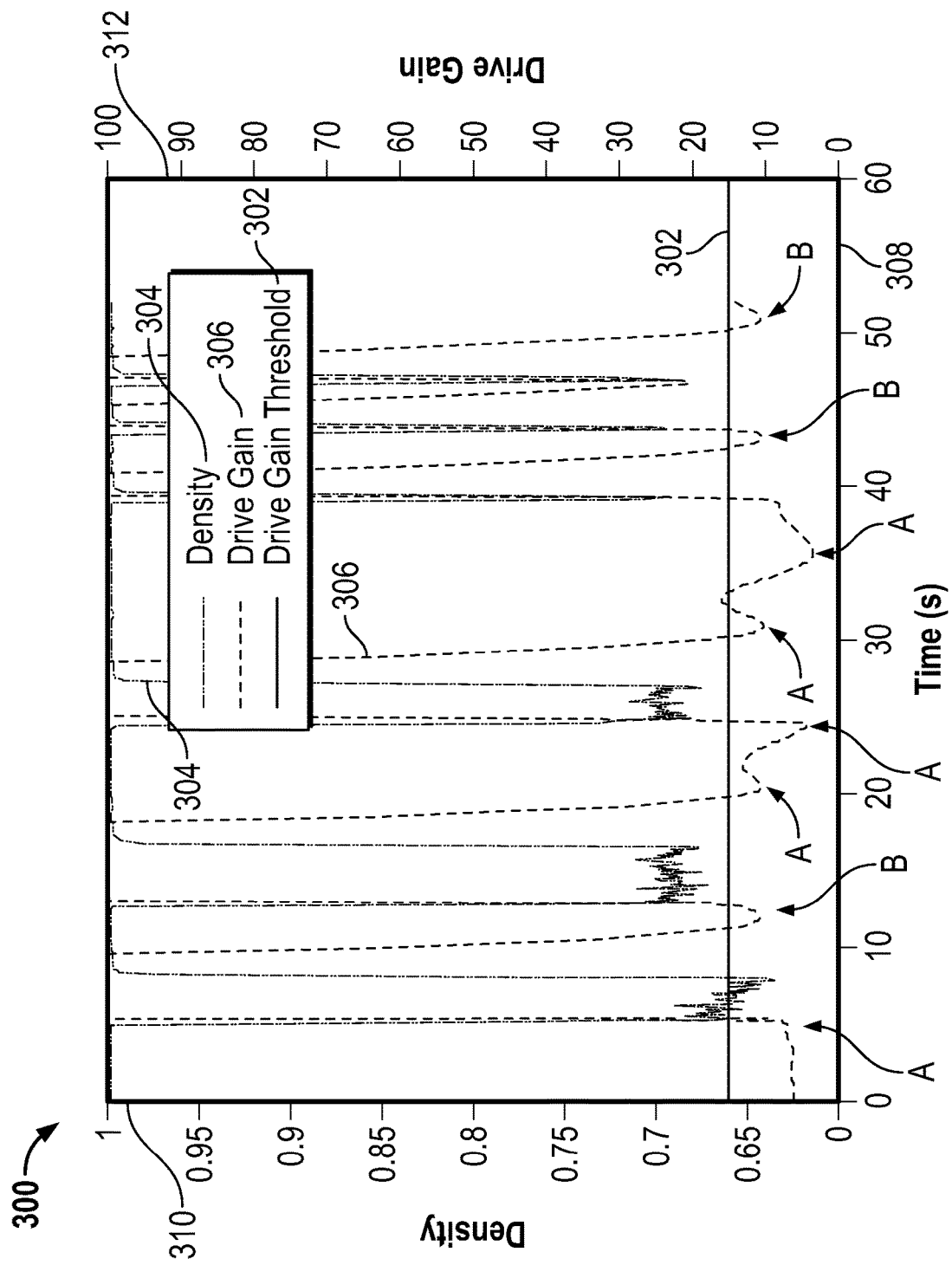
FIG. 3 illustrates a graph of a sample drive gain threshold determination.

With reference to FIG. 3, to determine the drive gain threshold 302, a predetermined time period of the drive gain signal is monitored. An updated drive gain threshold 302 is determined based upon the minimum threshold required such that drive gain 306 drops below the drive gain threshold 302 a specified number of times over the predetermined time period. FIG. 3 illustrates sample data 300 from a Coriolis mass flowmeter representing density 304 and drive gain 306 taken over a period of time. The x-axis 308 represents time, the left y-axis 310 represents density 304, and the right y-axis 312 represents drive gain 306. During the course of the data log, a fluid was introduced through the flowmeter 5 having entrained gas at various time points and at various volumes. A drive gain threshold 302 of 15.1% was determined for this particular flowmeter 5, which was based on a 50 second drive gain threshold period. The relative location of the five lowest drive gain periods from which drive gain threshold 302 was determined are labeled as points "A".

In an embodiment, an additional option is to require drive gain 306 to drop below the drive gain threshold 302 for a predetermined length of time. This predetermined length of time is the time needed for drive gain 306 to be below the drive gain threshold 302 before the drive gain threshold determination routine 215 determines entry into a corrective state and acquires new hold values. This protects against instantaneous excursions of a noisy drive gain signal that do not truly represent a sustained drop in damping due to less gas in the flow tubes. In FIG. 3, the predetermined length of time was set to two seconds, and the number of desired hold values set to five. There are a number of low drive gain periods on the plot (labeled as points "B") that appear below the drive gain threshold 302—however, drive gain 306 was not below the threshold line for at least two seconds. Therefore, these points were ignored in determining the drive gain threshold 302.

The number of hold values desired over a predetermined time period is determined based upon the application and conditions. A drive gain threshold 302 that would produce the desired number of hold values over the predetermined time period is estimated, and then used during the subsequent time period for the determination of hold values. Thus, in an embodiment, a new threshold is determined for a particular time period based off of readings from the preceding time period. Because process conditions are fairly steady in these scenarios, it is assumed that the threshold determined from one time period will be relevant during the next time period when it is used, thus producing roughly the same number of hold values. However, in an alternate embodiment, the drive gain threshold determination routine 215 is based on a rolling window of data rather than on discrete time periods. In this case, the drive gain threshold 302 would be continuously updated and be more relevant to current conditions.

Unsteady Applications

In other applications, it may be assumed only that the density remains constant during periods of high drive gain ("unsteady applications"). Because of this, it can only be assumed that mass flow rate measurements accurately measure the liquid mass flow rate when there is gas present. This allows liquid volume flow rate to be determined from the following equation, for example without limitation:

$$\dot{V}_{liquid\ 2} = \frac{\dot{m}_{liquid\ 2}}{\rho_{liquid\ 1}} \quad (2)$$

For unsteady applications, it is possible that the liquid density may also fluctuate, possibly due to changes in watercut, for example, without limitation. Because of this, the drive gain threshold 302 is set slightly higher than for steady applications. As such, the flowmeter 5 does not spend as much time in a corrective state, which is in contrast to the above-noted steady applications where process conditions are constant enough that it is ideal to be more conservative and remain in a corrective state more often.

It should be noted that simply increasing the number of desired hold values will not achieve the desired behavior of real-time measurement. Drive gain 306 may be low and steady for most of the time in some unsteady applications despite that density, volume flow, and mass flow rate may fluctuate. It should also be noted that while drive gain is low, there are still often tiny fluctuations. For example, without limitation, even when there is no entrained gas in the process fluid, the drive gain will not stay constant at say 4%, but will rather fluctuate erratically between 3.9 and 4.1%. These fluctuations can be due to flow noise or pipe vibrations. Again, this is merely an example for illustrative purposes. Should the threshold methodology described above for steady applications be utilized, the threshold could be set relatively low (e.g. 4%, with reference to the example above), yet still produce many hold values. For unsteady applications, when drive gain is this low it would not be advantageous to hold density, since density might change, and it is important to note and measure this change to maintain accurate readings. Again, this is not much of a concern for steady applications, as density does not change quickly.

In an embodiment for unsteady applications, in order to prevent density or other hold values from being undesirably held in cases such as those described above, a constant may be added to the automatically determined drive gain threshold 302. Turning to the above example yet again, if the threshold were automatically determined to be 4%, given five hold values during a particular time period, then this could be increased by 5% to 9%, for example without limitation. This allows a measured density to be output most of the time, with exceptions made for periods having enough entrained gas to increase the drive gain significantly—much more than 5% above a no-gas period, for example.

Figure 4:
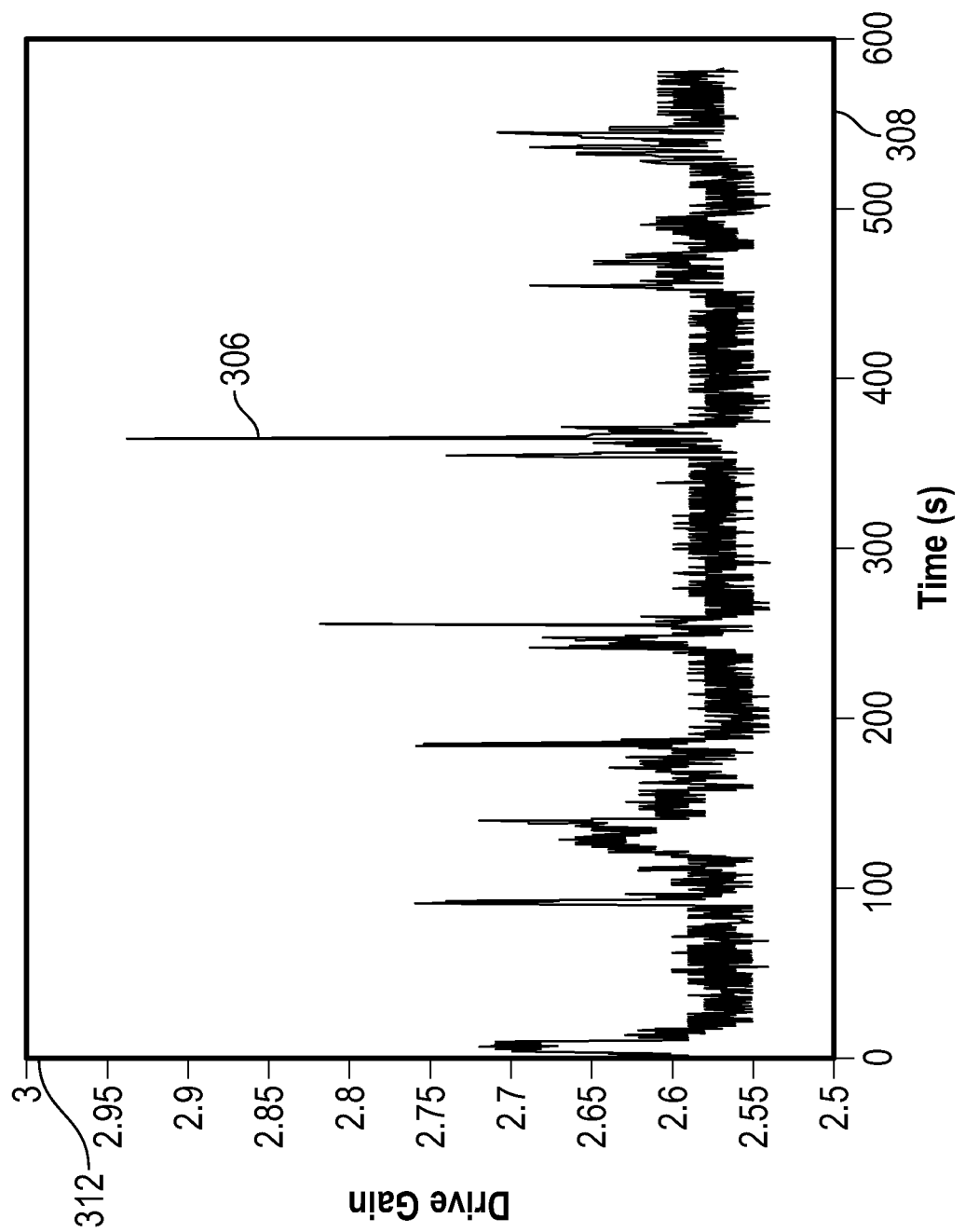
FIG. 4 illustrates a graph of a sample drive gain log over time.

To illustrate this point, FIG. 4 is a 600 second plot illustrating drive gain logged from a flowmeter 5 receiving liquid oil process material flow from a gas-liquid separator. As can be seen, drive gain is relatively low (<3%) for the duration of the log. When drive gain is this low, there is high confidence that there is no gas in the fluid. Despite being low, there are still small fluctuations in drive gain between 2.5 and 3%, which is likely an artifact due to flow noise in the system generated from a separator valve turning on and off. The drive gain threshold determination routine 215 determined a drive gain threshold 302 of 2.56% over a 500 second period. This is merely an example of a flowmeter test, and other fluids, applications, thresholds, time periods, etc. are contemplated. This is only a small sampling of data, and in many applications, the threshold period would be set to determine a drive gain threshold 302 over a period spanning a few minutes to a few hours or even longer depending on operating conditions. In operation of the drive gain threshold determination routine 215, for this example, the option to require drive gain 306 to drop below the drive gain threshold 302 for a predetermined length of time was set to two seconds, and the number of desired hold values for this period was set to five. In other words, during the first 500 seconds of the data, drive gain drops below 2.56%, for a minimum of 2 seconds, 5 times, creating 5 hold values.

This example further illustrates that the vast majority of the time, drive gain is above 2.56%, which means that density and/or other hold values are held most of the time. This would be fine for steady applications because process conditions are not expected to change on a short time scale, however for unsteady applications, density may be subject to change during this time period, thus the excessive holding of values may be suboptimal. By simply adding a constant, say 5% for example without limitation, to the threshold, the drive gain threshold determination routine 215 would never enter a corrective state and any changes in density would be measured. In this case, should a gas slug enter the flowmeter 5, the drive gain would spike well above 8% and density would be held. This results in the combined benefit of the automatically determined drive gain threshold 302, giving all the advantages in time and labor savings mentioned above, without substantially changing how the meter would behave in a typical application.

Extended Drive Gain

In typical Coriolis meters, the amount of power provided to the driver is often limited by hazardous area requirements. The volume of gas needed to force drive gain to 100% is thus relatively small—usually less than 1% GVF. It is therefore possible that low gas periods have enough gas to force drive gain 306 to 100%, thus effectively ending the usefulness of a drive gain diagnostic attempting to distinguish between varying amounts of gas. In the case of 100% drive gain 306, the drive gain threshold 302 would be set to 100%, and there would be no way to distinguish between periods of low and high gas. This would only allow an operator to know that there is enough gas present to yield a 100% drive gain, which is not particularly useful. To solve this problem, an embodiment provides an extended drive gain diagnostic. Extended drive gain is what the drive gain would be if more power were available, with 100% drive gain still equal to the maximum power allowed. For example, 200% drive gain indicates that two times the available power is needed to drive the meter at the set amplitude. Thus, extended drive gain can go above 100%. Extended drive gain is calculated using the following equation:

$$\text{Extended Drive Gain} = \frac{\text{Drive Target}}{\left(\frac{\text{Max}(LPO, RPO)}{\lambda}\right)} \quad (3)$$

Where:
Drive Target=conduit amplitude set point in mV/Hz;
Max (LPO, RPO)=maximum pickoff voltage between the left and right pickoff sensors
$\lambda$=the frequency of the flow conduits.
The quantity $$\left(\frac{\text{Max}(LPO, RPO)}{\lambda}\right)$$

represents the true tube amplitude. Once drive gain reaches 100%, due to insufficient power, true tube amplitude drops below the set point tube amplitude. Once drive gain reaches 100%, extended drive gain continues to increase as the true tube amplitude continues to drop below the set point tube amplitude.

Figure 5:
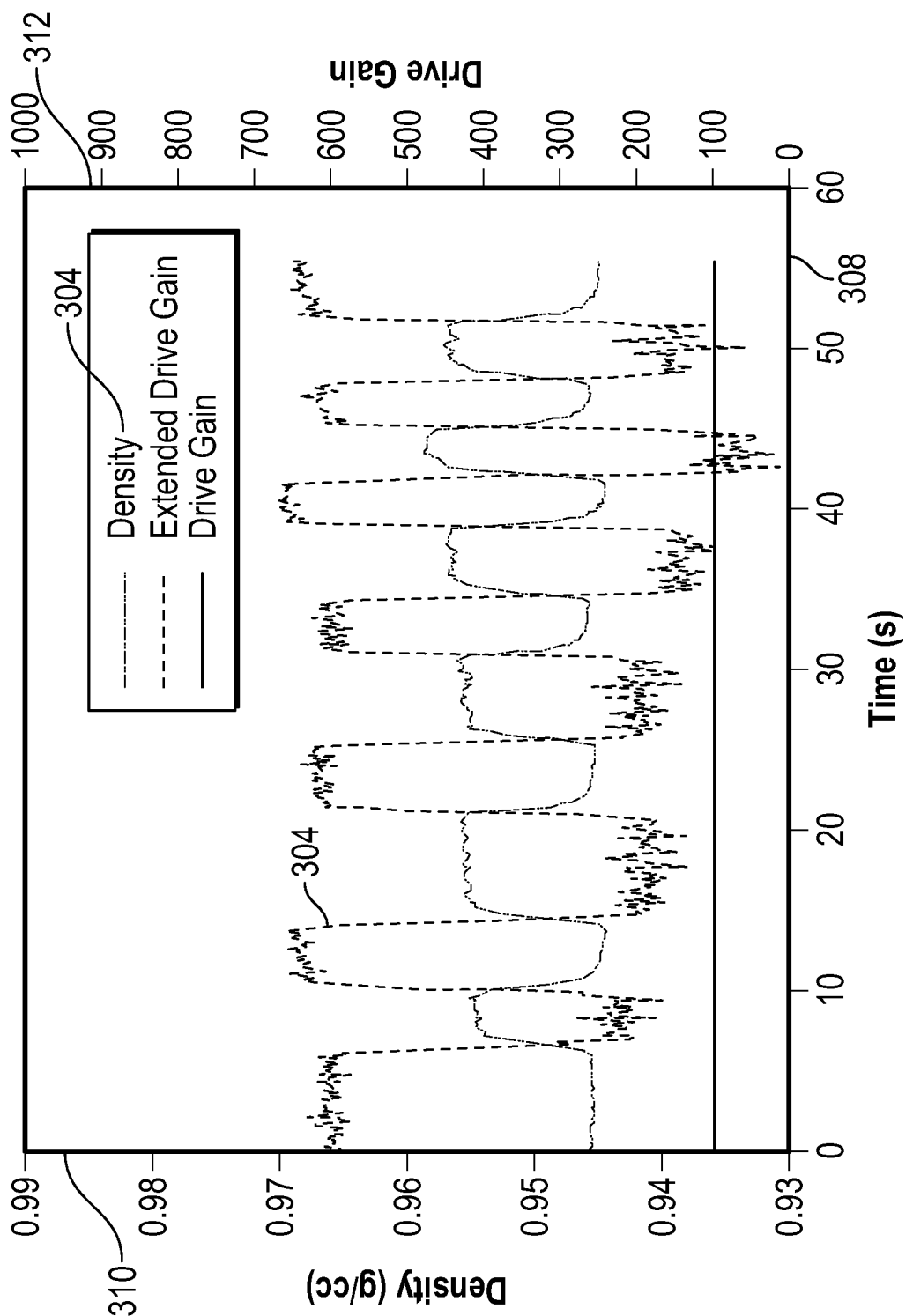
FIG. 5 illustrates a graph of a sample implementation of an extended drive gain.

FIG. 5 illustrates a situation where there is enough entrained gas in process fluid that drive gain never actually drops below 100%. This is a scenario typical in wellhead applications, but may be present in other applications as well. It will be clear, however, that by looking at density 304, there are still periods of high and low gas volume, corresponding to when density 304 is low and high, respectively. Although there is always gas in the flowmeter 5 in this situation, it is still beneficial to create hold values from periods that exhibit lower levels of entrained gas, for these hold values may be used to improve measurements collected during periods of higher gas concentrations. This corrected measurement is still in error, but it is a substantial improvement in accuracy over the standard, prior art, flowmeter 5 measurements. Using a standard drive gain 306, the drive gain threshold 302 would be set at 100% and it would be impossible to distinguish between high and low gas periods. An extended drive gain is able to distinguish between these periods.

Drive Gain Threshold Damping

As noted, the drive gain threshold determination routine 215 automatically determines the drive gain threshold 302 to provide a certain number of hold value updates during a given time period. However, in certain applications, GVF increases and decreases at inconsistent time intervals. As an example of such an instance, quick oscillations in gas fraction may occur due to partial separation as a gas/liquid mixture comes from a well bore, which results in slugs of gas on a second-by-second time scale. However, in other applications, there may be longer time scale trends in gas fraction. In an embodiment, the drive gain threshold 302 is adjusted to accommodate increases and decreases of GVF at inconsistent time intervals. In an example embodiment, a fluid source having frequent hydrodynamic slugging during a hypothetical first time period would cause the method to "do the best it can" and find a predetermined number of updated hold values. If a hypothetical subsequent time period were to contain almost no gas, the drive gain threshold 302 determined from the previous period (containing more gas), would find and record an increased number of hold values since there is less gas in the system. This is because less total gas equates to drive gain 306 drops below the previously determined threshold on a more frequent basis. The threshold from this low-gas period will then be set lower for the next period. A third hypothetical time period could occur having a relatively large volume of gas. Because of the low threshold from the previous time period, drive gain 306 may never drop below the drive gain threshold 302 in which case no hold values would be recorded during this time period. Since the hold values determined in the previous time period were determined from periods of lower gas, the readings in this time period would be more accurate. If during a fourth hypothetical time period, the relatively high gas content remains the same as during the third hypothetical time period, then a predetermined number of hold values will be produced because the drive gain threshold 302 was determined from a period of similar gas content. These new hold values will replace the prior hold values.

The success or failure of the measurement employing this method depends largely on the ability to exploit more accurate data while throwing out less accurate data. In an embodiment, the preference is to favor recent data versus old data to make sure actual changes in process fluid conditions are not missed.

In an embodiment, in order to overcome the above-described sub-optimal behavior, and to control the tradeoff between accuracy and newness, a one-sided damping filter is added to the drive gain threshold determination routine 215. By one-sided, it is meant that the damping filter damps values of drive gain threshold as they increase, but immediately adjusts down to new lower values. This embodiment has several significant benefits: (1) more accurate hold values are kept longer, (2) hold values are updated more often when drive gain is low, and (3) hold values determined during bad periods are quickly disposed of after even a single good new value is found. Thus, the damping filter makes the drive gain threshold determination routine 215 more adaptable to changing conditions.

Turning again to the above hypothetical example scenario, it would be advantageous to continue using the high accuracy hold values from period 2 for longer than just in period 3. To do this, the drive gain threshold 302 from period 4 would be based on an average or minimum of a predetermined number of previous drive gain thresholds 302. This effectively adds damping to the current drive gain threshold 302 and prevents it from quickly increasing due to higher gas content. This ensures that the only new hold values that are utilized are ones of a higher relative quality, as there would already be relatively recent and accurate values in use. Even in the case where there are no new good values for a time period, this is acceptable, as eventually the damped drive gain threshold 302 will rise high enough to allow newer, though less accurate, values to be used.

In order to damp the increase of the drive gain threshold 302, the drive gain threshold 302 may be based on the minimum of two quantities: First, the average or minimum of the current and some predetermined number of prior thresholds; and second, the drive gain threshold 302 in use. The number of prior thresholds to use, and whether or not to use the average or minimum, affects how long it takes for a new threshold to be created. For example, without limitation, if the minimum of previous thresholds is used, then the current drive gain threshold 302 may remain low for several time periods and it may take a while for a new hold value to be created. Should the average of prior drive gain thresholds 302 be used for comparison, then with each time period the active drive gain threshold 302 increases, the number of new hold values increase as well.

FIG. 6 is a table illustrating how damping the increase of drive gain threshold 302 reduces the number of hold values determined as the drive gain threshold 302 increases, thereby giving the drive gain threshold determination routine 215 the tendency to utilize more accurate data for longer periods of time. These values are hypothetical, and for illustrative purposes only. As illustrated, the minimum damping method used is based upon the current-plus-prior three thresholds. If the average damping method were used, the damped drive gain threshold 302 would slowly increase as the true drive gain threshold 302 quickly ramps up. The minimum method forces the drive gain threshold 302 to remain nearly constant as the true threshold increases. The number of hold values increases during time period 4. This is because the threshold used during period 4 (created during time period 3) is higher than the threshold created during period 4. Since a low drive gain threshold 302 indicates a low gas period, this results in more hold values. The number of hold values decreases during time period 6. This is because the threshold used during period 6 (created during period 5) is less than the threshold created during period 6. Not only are the number of hold values diminished, but also note that the drive gain threshold 302 has not yet risen, which means that the hold values that are captured are of higher quality. During period 8, using the standard threshold, five new hold values are found. This is because the drive gain threshold 302 created during period 8 is the same as the threshold used during period 8, which indicates that the gas content between the two periods is similar. On the other hand, the damped threshold used during period 8 is much lower, resulting in zero new hold values. This adds to accuracy, since any hold values created during this period would likely be in error due to the increased gas content, so it is advantageous to continue using hold values from a period having low entrained gas levels.

The present description depicts specific examples to teach those skilled in the art how to make and use the best mode of the invention. For example, oil and gas wells are used for illustrative purposes, but the embodiments described herein are contemplated for use in any application of a fluid flow. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A method for determining a drive gain threshold for a vibratory flowmeter comprising:
   placing a process fluid in the vibratory flowmeter;
   determining a first predetermined drive gain threshold;
   monitoring a drive gain signal over a predetermined time period;
   determining local minima in the drive gain signal over the predetermined time period; and
   determining a second drive gain threshold based upon reaching a predetermined number of instances of local minima of the drive gain signal.

2. The method of claim 1, comprising the step of replacing the first predetermined drive gain threshold with the second predetermined drive gain threshold.

3. The method of claim 2, wherein the step of replacing the first predetermined drive gain threshold with the second predetermined drive gain threshold comprises a damping such that the first predetermined drive gain threshold is replaced with an average of the second predetermined drive gain threshold and a predetermined number of previously recorded drive gain thresholds.

4. The method of claim 2, wherein the step of replacing the first predetermined drive gain threshold with the second predetermined drive gain threshold comprises a damping such that the first predetermined drive gain threshold is replaced with a minimum of the second predetermined drive gain threshold and a predetermined number of previously recorded drive gain thresholds.

5. The method of claim 1, comprising the step of recording at least one hold value during periods where the drive gain signal drops below the first predetermined drive gain threshold.

6. The method of claim 5, wherein the at least one hold value comprises at least one of a flow rate and a density of the process fluid.

7. The method of claim 1, comprising the step of averaging values of the drive gain signals recorded during each instance where the drive gain signal drops below the first predetermined drive gain threshold.

8. The method of claim 1, comprising the step of recording each instance where the drive gain signal drops below the first predetermined drive gain threshold, only if the drive gain signal drops below the first predetermined drive gain threshold for a predetermined period of time.

9. The method of claim 1, wherein the predetermined time period for monitoring a drive gain signal comprises a rolling window.

10. The method of claim 1, comprising the step of adding a constant value to at least one of the first predetermined drive gain threshold and the second predetermined drive gain threshold.

11. The method of claim 1, comprising the step of: calculating the drive gain signal wherein $$\text{drive gain} = \frac{\text{Drive Target}}{\left(\frac{\text{Max}(LPO, RPO)}{\lambda}\right)},$$

where:
Drive Target is a conduit amplitude set point;
Max (LPO, RPO) is a maximum pickoff voltage between a left and right pickoff sensors; and
$\lambda$ is a frequency of the flow conduits.

12. Meter electronics (20) for a flowmeter (5) configured to receive a process fluid, the meter electronics (20) comprising an interface (201) configured to communicate with a sensor assembly (10) of the flowmeter (5) and receive a vibrational response, and a processing system (203) coupled to the interface (201) comprising:
a drive gain threshold determination routine (215) configured to:
determine a first predetermined drive gain threshold (302);
monitor a drive gain signal over a predetermined time period;
determine local minima in the drive gain signal over the predetermined time period; and
determine a second drive gain threshold based upon reaching a predetermined number of local minima of the drive gain signal.

13. The meter electronics (20) of claim 12, wherein the drive gain threshold determination routine (215) is configured to replace the first predetermined drive gain threshold (302) with the second predetermined drive gain threshold.

14. The meter electronics (20) of claim 13, wherein replacing the first predetermined drive gain threshold (302) with the second predetermined drive gain threshold comprises a damping such that the first predetermined drive gain threshold (302) is replaced with an average of the second predetermined drive gain threshold and a predetermined number of previously recorded drive gain thresholds.

15. The meter electronics (20) of claim 13, wherein replacing the first predetermined drive gain threshold (302) with the second predetermined drive gain threshold comprises a damping such that the first predetermined drive gain threshold (302) is replaced with the minimum of the second predetermined drive gain threshold and a predetermined number of previously recorded drive gain thresholds.

16. The meter electronics (20) of claim 12, wherein the drive gain threshold determination routine (215) is configured to record at least one hold value during periods where the drive gain signal drops below the first predetermined drive gain threshold (302).

17. The meter electronics (20) of claim 16, wherein the at least one hold value comprises at least one of a flow rate and a density of the process fluid.

18. The meter electronics (20) of claim 12, wherein the drive gain threshold determination routine (215) is configured to average values of the drive gain signals recorded during each instance where the drive gain signal drops below the first predetermined drive gain threshold (302).

19. The meter electronics (20) of claim 12, wherein the drive gain threshold determination routine (215) is configured to determine the local minima in the drive gain signal over the predetermined time, only if the drive gain signal drops below the first predetermined drive gain threshold (302) for a predetermined period of time.

20. The meter electronics (20) of claim 12, wherein the predetermined time period for monitoring a drive gain signal comprises a rolling window.

21. The meter electronics (20) of claim 12, wherein the drive gain threshold determination routine (215) is configured to add a constant value to at least one of the first predetermined drive gain threshold (302) and the second predetermined drive gain threshold.

22. The meter electronics (20) of claim 12, wherein the drive gain threshold determination routine (215) is configured to calculate the drive gain signal wherein $$\text{drive gain} = \frac{\text{Drive Target}}{\left(\frac{\text{Max}(LPO, RPO)}{\lambda}\right)},$$

where:
Drive Target is a conduit amplitude set point;
Max (LPO, RPO) is a maximum pickoff voltage between a left and right pickoff sensors (105, 105'); and
$\lambda$ is a frequency of the flow conduits (103A, 103B).

* * * * *